US010972863B2

(12) United States Patent
Futaki

(10) Patent No.: US 10,972,863 B2
(45) Date of Patent: *Apr. 6, 2021

(54) RSU APPARATUS, BASE STATION APPARATUS, CONTROL NODE, AND METHODS THEREIN

(71) Applicant: NEC CORPORATION, Tokyo (JP)

(72) Inventor: Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/778,933

(22) Filed: Jan. 31, 2020

(65) Prior Publication Data

US 2020/0169838 A1 May 28, 2020

Related U.S. Application Data

(63) Continuation of application No. 15/755,611, filed as application No. PCT/JP2016/002994 on Jun. 21, 2016, now Pat. No. 10,595,157.

(30) Foreign Application Priority Data

Sep. 18, 2015 (JP) ................................. 2015-185291

(51) Int. Cl.
*H04W 4/021* (2018.01)
*H04W 4/44* (2018.01)
(Continued)

(52) U.S. Cl.
CPC ............. *H04W 4/021* (2013.01); *G08G 1/09* (2013.01); *H04W 4/06* (2013.01); *H04W 4/44* (2018.02);
(Continued)

(58) Field of Classification Search
CPC ......... H04W 4/021; H04W 4/44; H04W 4/06; H04W 92/18; H04W 4/90; H04W 76/11; G08G 1/09; G08G 1/091
See application file for complete search history.

(56) References Cited

U.S. PATENT DOCUMENTS

2014/0051346 A1* 2/2014 Li ........................... H04W 4/46
455/3.01
2015/0334721 A1* 11/2015 Kim ....................... H04W 72/02
370/330
(Continued)

FOREIGN PATENT DOCUMENTS

CN 102625239 A 8/2012

OTHER PUBLICATIONS

LG Electronics Inc., "V2X by UE type RSU", 3GPP TSG-SA WG1 Meeting #71, Aug. 17, 2015, S1-152612, 3 pages.
(Continued)

*Primary Examiner* — Ajay Cattungal
(74) *Attorney, Agent, or Firm* — Sughrue Mion, PLLC

(57) ABSTRACT

A Road Side Unit (RSU) (120) transmits V2X report information to a control node (140) and transmits location-related information about the RSU (120) to the control node (140). The control node (140) determines, based on the received location-related information about the RSU (120), at least one of: one or more sending nodes; a transmission area; a distribution path; and a communication scheme, to distribute a V2X control message to a plurality of UEs. It is thus, for example, possible to contribute to achievement of a configuration in which, upon receiving V2X report information from an RSU, a server transmits a V2X control message based on the V2X report information to a plurality of vehicles or pedestrians.

8 Claims, 13 Drawing Sheets

(51) Int. Cl.
  *H04W 4/06* (2009.01)
  *H04W 92/18* (2009.01)
  *G08G 1/09* (2006.01)
  *H04W 4/90* (2018.01)
  *H04W 76/11* (2018.01)

(52) U.S. Cl.
  CPC .............. *H04W 4/90* (2018.02); *H04W 76/11* (2018.02); *H04W 92/18* (2013.01); *G08G 1/091* (2013.01)

(56) References Cited

U.S. PATENT DOCUMENTS

| | | | | |
|---|---|---|---|---|
| 2016/0119151 A1* | 4/2016 | Park | ...................... | H04L 9/3268 |
| | | | | 713/158 |
| 2016/0285935 A1* | 9/2016 | Wu | ........................ | G08G 1/161 |
| 2018/0077668 A1* | 3/2018 | Chun | .................... | H04W 76/23 |
| 2018/0109937 A1* | 4/2018 | Lee | .................. | G08G 1/096775 |
| 2018/0139593 A1* | 5/2018 | Chun | ...................... | H04W 4/12 |
| 2018/0184270 A1* | 6/2018 | Chun | .................... | H04W 24/08 |
| 2018/0191551 A1* | 7/2018 | Chun | ...................... | H04L 67/12 |
| 2018/0213365 A1* | 7/2018 | Yi | ............................ | H04W 4/40 |
| 2018/0213446 A1* | 7/2018 | Chun | ...................... | H04W 8/24 |
| 2018/0242115 A1* | 8/2018 | Kim | ....................... | H04W 4/40 |
| 2018/0270722 A1* | 9/2018 | Kim | ....................... | H04W 36/00 |

OTHER PUBLICATIONS

3rd Generation Partnership Project;Technical Specification Group Services and System Aspects; Study on LTE Support for V2X Services,(Release 14), 3GPP TR 22.885, V0.2.0, Apr. 2015, 33 pages.

3rd Generation Partnership Project;Technical Specification Group Services and System Aspects; Study on LTE Support for V2X Services,(Release 14), 3GPP TR 22.885, V1.0.0, Sep. 10, 2015, 42 pages.

Communication dated Feb. 19, 2019 by the European Patent Office in application No. 16845859.4.

* cited by examiner

RSU APPARATUS, BASE STATION APPARATUS, CONTROL NODE, AND METHODS THEREIN

CROSS REFERENCE TO RELATED APPLICATIONS

This application is a Continuation Application of U.S. application Ser. No. 15/755,611 filed Feb. 27, 2018, which is a National Stage of International Application No. PCT/JP2016/002994, filed Jun. 21, 2016, claiming priority on Japanese Patent Application No. 2015-185291, filed Sep. 18, 2015, the contents of all of which are incorporated herein by reference in their entirety.

TECHNICAL FIELD

The present disclosure relates to a radio communication system and, in particular, to a V2X service.

BACKGROUND ART

Non-Patent Literature 1 discloses use cases and potential requirements regarding Long Term Evolution (LTE) based Vehicle-to-Everything (V2X) services. The V2X means vehicular communications and includes Vehicle-to-Vehicle (V2V) communications, Vehicle-to-Infrastructure (V2I) communications, and Vehicle-to-Pedestrian (V2P) communications. The V2V communications or the V2V Services are communication or services between User Equipments (UEs) that are installed in vehicles and use V2V applications. The V2I communications or the V2I Services are communications or services between a UE and a Road Side Unit (RSU), both of which use V2I applications. The V2I communication includes Infrastructures-to-Vehicle (I2V) communications, unless otherwise specified. Further, the term "UE" as used herein includes not only a UE installed in a vehicle but also a UE carried by a pedestrian. The RSU is an entity located on a road side and supports V2I Services including transmission and reception to and from vehicle UEs that use V2I applications. The RSU is installed in a base station, such as a LTE base station (i.e., Evolved Node B (eNB)), or in a stationary UE. The V2P communications or the V2P Services are communications or services between a vehicle UE and a pedestrian UE, both of which use the V2I application. The V2P communications may be performed via an RSU and is, accordingly, referred to as V2I2P communications or P2I2V communications.

Some use cases regarding the V2I Service disclosed in Non-Patent Literature 1 will be introduced here. Non-Patent Literature 1 discloses, in Section 5.6 V2I Emergency Stop Use Case, a configuration in which a vehicle and an RSU are each equipped with a Prose-enabled UEs and the vehicle and the RSU perform Proximity-based services (Prose) communication. ProSe communication is device-to-device (D2D) communication and includes direct communication between two or more ProSe-enabled UEs that are in proximity to each other. In this use case, a vehicle A transmits a message indicating an event, such as an emergency stop, to a service RSU. The service RSU receives this message from the vehicle A and then relays this message to its surrounding vehicles. All vehicles within the transmission range from the service RSU are able to receive this message.

In the use case disclosed in Section 5.14 "V2X Road safety service via infrastructure" of Non-Patent Literature 1, an RSU C detects that an accident has occurred in the area where the RSU C manages. The RSU C indicates the occurrence of this accident to a remote server (e.g., a Traffic Safety Server (TSS) or an Intelligent Transport Systems (ITS) server) and starts transmission of this information in the area. The server informs other RSUs near the RSU C that there is an accident in the area managed by the RSU. The other RSUs start transmission of V2X messages indicating that there is an accident in the area indicated by the RSU C.

CITATION LIST

Non-Patent Literature

[Non-Patent Literature 1] 3GPP S1-151330 "3GPP TR 22.885 V0.2.0 Study on LTE Support for V2X services (Release 14)", April, 2015

SUMMARY OF INVENTION

Technical Problem

Consider a use case in which a server transmits, in response to reception of V2X report information (e.g., accident notification) from an RSU, a V2X control message, which is based on the V2X report information, to a plurality of vehicles or pedestrians via a plurality of base stations (eNBs) or a plurality of RSUs (e.g., Section 5.14 of Non-Patent Literature 1). To achieve this use case, in one implementation, the server (or the base station) needs to determine a geographical area in which this V2X control message is to be distributed, or determine one or more sending nodes (i.e., an RSU or a base station) to transmit this V2X control message to a plurality of vehicles or pedestrians.

In another implementation, there may be a plurality of distribution paths available to transmit the V2X control message to a plurality of vehicles or pedestrians. For example, there may be a first available distribution path for a base station to transmit the message directly to a plurality of vehicle UEs or pedestrian UEs and a second available distribution path for a base station to transmit the message to a plurality of vehicle UEs or pedestrian UEs via one or more RSUs. In this case, the server (or the base station) needs to determine a distribution path to be used to transmit the V2X control message.

In still another implementation, there may be a plurality of communication schemes available to transmit the V2X control message to a plurality of vehicles or pedestrians. For example, a Cell Broadcast Service (CBS), a Multimedia Broadcast/Multicast Service (MBMS), and groupcast in D2D communication (e.g., ProSe communication) can be used. In this case, the server (or the base station) needs to determine a communication scheme to be used to transmit the V2X control message.

One of the objects to be attained by embodiments disclosed herein is to provide an apparatus, a method, and a program that contribute to achievement of a configuration in which, upon receiving V2X report information from an RSU, a server transmits a V2X control message based on this V2X report information to a plurality of vehicles or pedestrians. It should be noted that this object is merely one of the objects to be attained by the embodiments disclosed herein. Other objects or problems and novel features will be made apparent from the descriptions in the specification and the accompanying drawings.

Solution to Problem

In a first aspect, an RSU apparatus includes a wireless transceiver and at least one processor. The wireless transceiver is configured to communicate with a radio terminal installed in a vehicle. The at least one processor is configured to transmit V2X report information to a control node and transmit location-related information about the RSU apparatus to the control node.

In a second aspect, a method in an RSU apparatus includes transmitting V2X report information to a control node and transmitting location-related information about the RSU apparatus to the control node.

In a third aspect, a base station apparatus includes a wireless transceiver and at least one processor. The wireless transceiver is configured to communicate with a plurality of radio terminals including one or more Road Side Units (RSUs) supporting a Vehicle-to-Everything (V2X) service. The at least one processor is configured to transmit V2X report information received from a first RSU included in the one or more RSUs to a control node and to transmit location-related information about the first RSU to the control node.

In a fourth aspect, a method in a base station apparatus includes: (a) communicating with a plurality of radio terminals including one or more Road Side Units (RSUs) supporting a Vehicle-to-Everything (V2X) service; and (b) transmitting V2X report information received from a first RSU included in the one or more RSUs to a control node and transmitting location-related information about the first RSU to the control node.

In a fifth aspect, a control node includes a memory and at least one processor coupled to the memory. The at least one processor is configured to determine, based on location-related information about a first Road Side Unit (RSU) supporting a Vehicle-to-Everything (V2X) service, at least one of: (a) one or more sending nodes to transmit a V2X control message generated based on V2X report information transmitted by the first RSU in such a way that a plurality of vehicles are able to receive the V2X control message; (b) a geographical area in which the V2X control message is to be transmitted; (c) a logical area in which the V2X control message is to be transmitted; (d) a distribution path of the V2X control message to the one or more sending nodes; and (e) a communication scheme to be used for transmission of the V2X control message.

In a sixth aspect, a method in a control node includes determining, based on location-related information about a first Road Side Unit (RSU) supporting a Vehicle-to-Everything (V2X) service, at least one of: (a) one or more sending nodes is to transmit a V2X control message generated based on V2X report information transmitted by the first RSU in such a way that a plurality of vehicles are able to receive the V2X control message; (b) a geographical area in which the V2X control message is to be transmitted; (c) a logical area in which the V2X control message is to be transmitted; (d) a distribution path of the V2X control message to the one or more sending nodes; and (e) a communication scheme to be used for transmission of the V2X control message.

In a seventh aspect, a program includes instructions (software codes) that, when loaded into a computer, cause the computer to perform the method according to the above-described second, fourth, or sixth aspect.

Advantageous Effects of Invention

According to the above aspects, it is possible to provide an apparatus, a method, and a program that contribute to achievement of a configuration in which, upon receiving V2X report information from an RSU, a server transmits a V2X control message based on this V2X report information to a plurality of vehicles or pedestrians.

DESCRIPTION OF EMBODIMENTS

Specific embodiments are described hereinafter in detail with reference to the drawings. The same or corresponding elements are denoted by the same reference signs throughout the drawings, and repetitive descriptions will be omitted as necessary for clarity of explanation.

The following descriptions on the embodiments mainly focus on an Evolved Packet System (EPS) that contains LTE and System Architecture Evolution (SAE). However, these embodiments are not limited to being applied to the EPS and may be applied to other mobile communication networks or systems such as 3GPP UMTS, 3GPP2 CDMA2000 systems (1×RTT, High Rate Packet Data (HRPD)), global system for mobile communications (GSM (trademark))/General packet radio service (GPRS) systems, and WiMAX systems.

Figure 1:
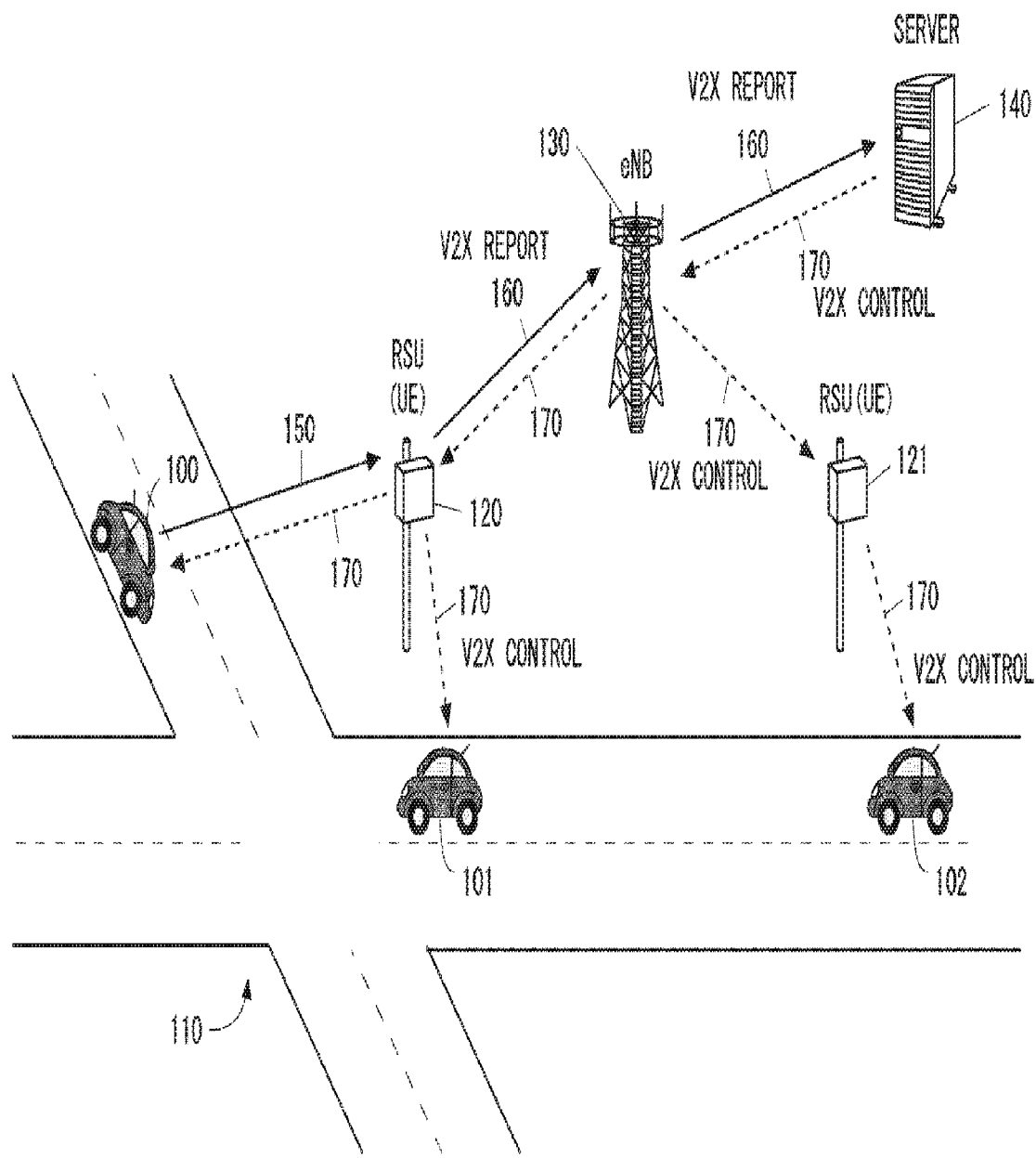
FIG. 1 is a diagram showing a configuration example of a radio communication system according to an embodiment.

FIG. 1 shows a configuration example of a radio communication system according to some embodiments. Radio terminals (i.e., UEs) 100-102 are installed in vehicles. Each of the vehicle UEs 100-102 may be implemented in an in-vehicle processing unit (e.g., a car navigation system). The vehicle UEs 100-102 each execute a V2I application to support the V2I Service. The UEs 100-102 may support another V2X service, i.e., a V2V Service or a V2P Service or both.

RSUs 120 and 121 are each installed on a road side. In the example shown in FIG. 1, the RSU 120 is installed near an intersection 110. The RSUs 120 and 121 each may be equipped with, for example, but not limited to, a Prose-enabled UE, and may perform ProSe communication with the vehicle UEs 100-102 to provide the V2I Service. The RSUs 120 and 121 may each serve as a ProSe UE-to-Network Relay (i.e., Relay UE). The ProSe UE-to-Network Relay mainly relays traffic (i.e., downlink and uplink) between a UE in out-of-coverage (i.e., remote UE) and the network. The RSUs 120 and 121 each communicate with a base station (eNB) 130 in a cellular communication network via a radio connection and also communicate with a server 140 (e.g., an ITS server or a TSS) via the eNB 130.

As already described above, Proximity-based services (ProSe) defined in 3GPP Release 12 are one example of D2D communication. The D2D communication includes at least one of Direct Communication and Direct Discovery. In 3GPP Release 12, an inter-UE radio link used for Direct Communication or Direct Discovery is referred to as a PC5 interface or Sidelink. Accordingly, it can be said that ProSe is a general term for communications (or services) that use at least the Sidelink. In the example shown in FIG. 1, the communication between the RSU 120 serving as a UE or a Relay UE and the UE 100 or 101 may use the Sidelink, and the communication between two or more UEs may also use the Sidelink. In 3GPP Release 12, sidelink transmission uses the same frame structure as uplink and downlink transmission of the Long Term Evolution (LTE), and uses a subset of uplink resources in frequency and time domains. In 3GPP Release 12, a UE performs sidelink transmission by using Single-Carrier Frequency-Division Multiple Access (SC-FDMA), which is similar to the scheme used in uplink transmission.

Upon receiving a notification 150 from the vehicle UE 100, the RSU (UE) 120 generates V2X report information 160 based on the notification 150, and sends the generated V2X report information 160 to the server 140 via the eNB 130. For example, the RSU (UE) 120 may inspect (or detect) the content of the notification 150 and generate the V2X report information 160 that contains the content of the notification 150. Alternatively, without inspecting the notification 150 from the UE 100, the RSU (UE) 120 may generate and transmit the V2X report information 160 that contains the notification 150 from the UE 100.

The notification 150 may be, for example, but not limited to, a message regarding an emergency stop or an accident regarding a vehicle equipped with the UE 100, a message regarding a driving status of the vehicle, or a message regarding conditions of nearby roads (e.g., a traffic jam, weather, an accident, an obstacle on the road). The UE 100 may incorporate into the notification 150 a V2V message received from another vehicle (UE) via V2V communication, or a message derived from the V2V message. Further, the RSU (UE) 120 may receive a V2V message transmitted by the UE 100 via V2V communication as the notification 150. In this case, the RSU (UE) 120 may use this V2V message or a message derived from this V2V message as the V2X report information 160. Note that the RSU (UE) 120 may autonomously generate the V2X report information 160 without depending on the reception of the notification 150 from the vehicle UE 100. For example, the RSU (UE) 120 may monitor conditions of roads in its management area (e.g., a traffic jam, weather, an accident, or an obstacle on the road) using sensors, such as cameras and weather instruments, and generate the V2X report information 160 based on the result of the monitoring.

Upon receiving the V2X report information 160 from the RSU (UE) 120, the server 140 generates a V2X control message 170 based on the V2X report information 160. The V2X control message 170 may include, for example, a warning about road conditions (e.g., occurrence of an accident or a traffic jam) or detour route guidance. The server 140 transmits the V2X control message 170 in such a way that vehicle UEs including the vehicle UEs 100-102 can receive the V2X control message 170. In the example shown in FIG. 1, the V2X control message 170 is transmitted from the server 140 to the RSUs (UEs) 120 and 121 via the eNB 130 and then transmitted to the vehicle UEs 100-102 by each RSU (UE).

Note that the distribution path of the V2X control message 170 from the server 140 to the UEs 100-102 shown in FIG. 1 is merely an example. In other words, the server 140 can use a plurality of distribution paths to distribute the V2X control message 170 to the UEs 100-102. Further, these distribution paths can use communication schemes different from each other. Accordingly, the server 140 can use a plurality of distribution paths and a plurality of communication schemes to distribute the V2X control message 170 to the UEs 100-102. The communication schemes include, for example, a Cell Broadcast Service (CBS), a Multimedia Broadcast/Multicast Service (MBMS), and groupcast in D2D communication (e.g., ProSe communication). In the groupcast, for example, a receiver side (e.g., UE) determines whether information should be received by performing certain filtering processing, and restores this information if this information should be received. In the certain filtering processing, for example, a UE may restore a group identifier contained in the layer-2 header and determine whether this group identifier should be received. The group identifier may be configured in the receiver side (e.g., UE) in advance or may be sent from the transmitter side (e.g., eNB or application server). The group identifier may be information indicating a specific group (e.g., UEs) or may be a V2X SA Index (ID).

Figure 2:
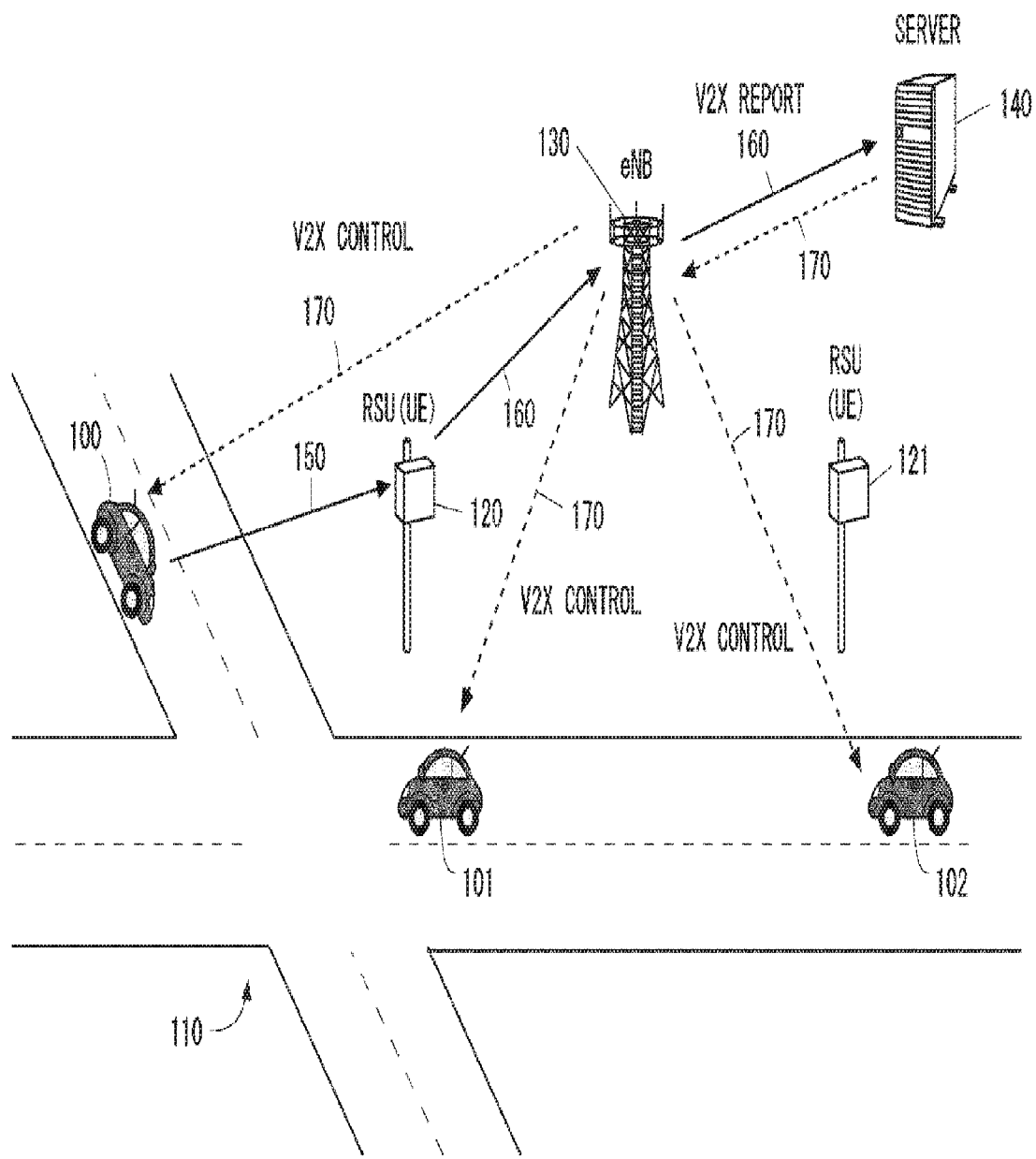
FIG. 2 is a diagram showing a configuration example of a radio communication system according to an embodiment.

FIG. 2 shows another distribution path of the V2X control message 170 different from the distribution path shown in FIG. 1. In the example shown in FIG. 2, the V2X control message 170 is transmitted from the eNB 130 directly to the vehicle UEs 100-102 without traversing the RSUs (UEs) 120 and 121. For example, the eNB 130 may broadcast/multicast the V2X control message 170 in such a way that a plurality of UEs located within a cell served by the eNB 130 are able to receive this message.

In some implementations, the eNB 130 may transmit the V2X control message 170 on the user plane (U-plane). Specifically, the eNB 130 may transmit the V2X control message 170 using a broadcast bearer, a multicast bearer, or a Point-to-Multipoint (PTM) bearer. The V2X control message 170 may be transmitted on a Data Radio Bearer for carrying MBMS data, i.e., an MBMS Radio Bearer (MRB) or a Point-to-Multipoint (PTM) Radio Bearer. In MBMS, the same data (message) is transmitted to a plurality of UEs via a common MRB (or a PTM radio bearer).

Alternatively, in some implementations, the eNB 130 may transmit the V2X control message 170 on the control plane (C-plane). The eNB 130 may transmit the V2X control message 170 on a Broadcast Control Channel (BCCH) that carries a System Information Block (SIB). For example, Aa Public Warning System (PWS) for CBS in LTE/Evolved Packet System (EPS) may be used. The 3GPP specifies, as the PWS, Earthquake and Tsunami Warning System (ETWS) used in Japan, Commercial Mobile Alert System (CMAS) used in North America, Korean Public Alert System (KPAS) used in Korea, and EU-ALERT used in European countries. In the PWS, warning messages (Primary Notification and Secondary Notification) are transmitted by SIB 10 and SIB 11. When the V2X control message 170 is transmitted on the C-plane, it may be transmitted from the server 140 to the eNB 130 via a Mobility Management Entity (MME). In this case, the V2X control message may be transmitted by a WRITE-REPLACE WARNING REQUEST message.

Figure 3:
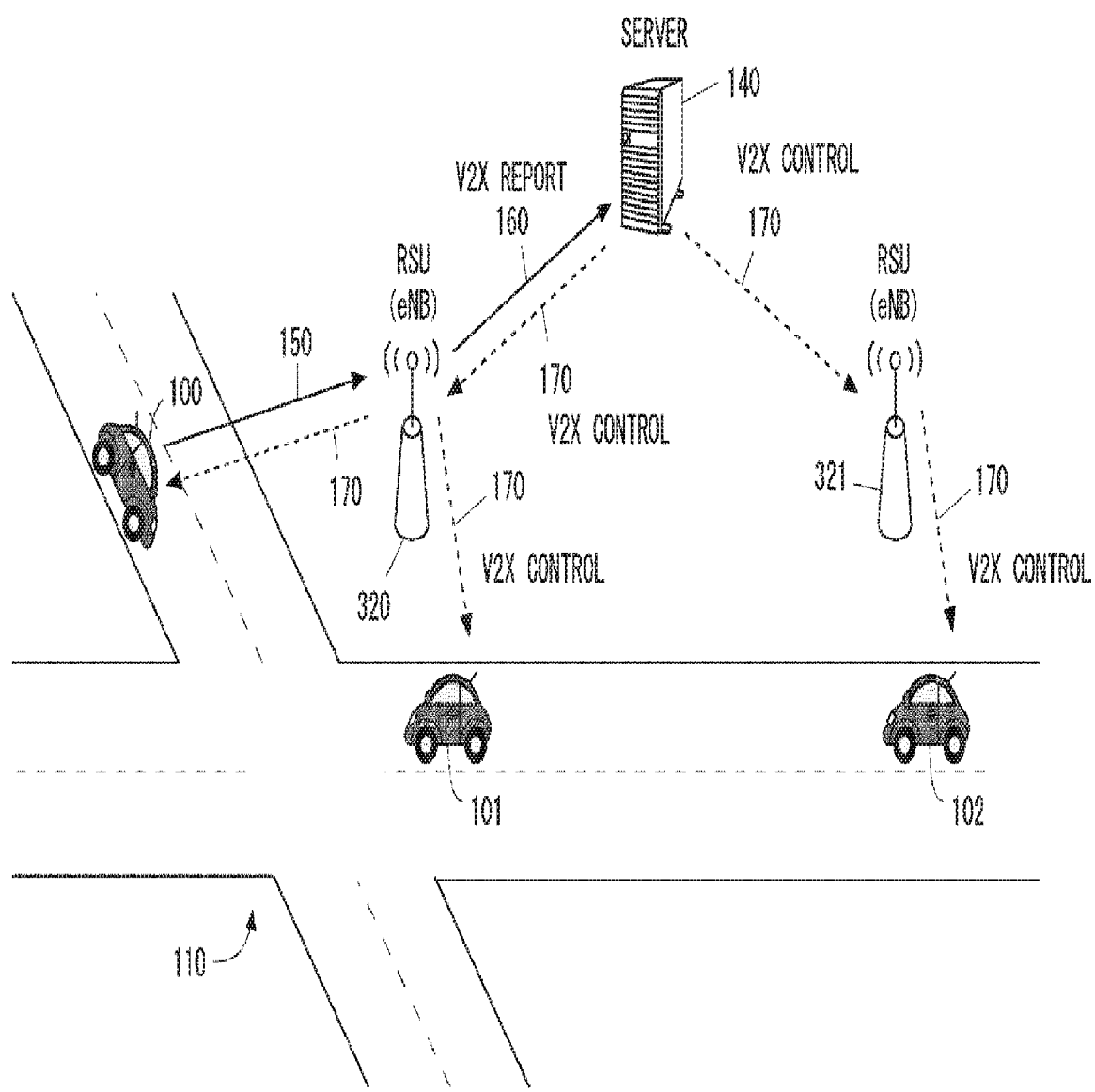
FIG. 3 is a diagram showing a configuration example of a radio communication system according to an embodiment.

FIG. 3 shows another configuration example of the radio communication system according to some embodiments. In the example shown in FIG. 3, each of RSUs 320 and 321 serves as a base station (eNB). In response to receiving a notification 150 from the vehicle UE 100, the RSU (eNB) 320 generates the V2X report information 160 based on the notification 150 and sends the generated V2X report information 160 to the server 140. In response to receiving the V2X report information 160 from the RSU (eNB) 320, the server 140 generates a V2X control message 170 based on the V2X report information 160. Similar to the examples shown in FIGS. 1 and 2, the server 140 transmits the V2X control message 170 in such a way that a plurality of vehicle UEs including the vehicle UEs 100-102 can receive the V2X control message 170. However, in the example shown in FIG. 3, the V2X control message 170 is transmitted from the server 140 to the RSUs (eNBs) 320 and 321 and then transmitted to the vehicle UEs 100-102 by the RSUs (eNBs). The RSUs (eNBs) 320 and 321 may transmit the V2X control message 170 either on the U-plane or on the C-plane, similar to the eNB 130 shown in FIG. 2.

FIGS. 1-3 show the examples in which the V2X control message 170 is received by the plurality of vehicle UEs 100-102. However, the V2X control message 170 may be received by pedestrians (i.e., pedestrian UEs).

In the configurations shown in FIGS. 1 and 2, the communication between the eNB 130 and the RSU 120 serving as a UE may use a dedicated carrier frequency band f1 reserved for the V2X service. Alternatively, the communication between the RSU (UE) 120 and the eNB 130 may use a shared frequency band (or a Shared spectrum) f2 that is not licensed to any operator or is shared by a plurality of operators. Such a communication using a shared frequency is referred to as Licensed Shared Access (LSA). Alternatively, the communication between the RSU (UE) 120 and the eNB 130 may use a carrier frequency band f3 that is licensed to an operator of the cellular communication network. In a similar way, communication between the UE 100 and the RSU (UE) 120 and communication between the UE 100 and the eNB 130 may use any one of the above-described frequency bands f1, f2, and f3. Further, in the configuration shown in FIG. 3, communication between the UE 100 and the RSU 320 serving as an eNB may also use any one of the above-described frequency bands f1, f2, and f3. Furthermore, in the configuration shown in FIGS. 1-3, communication between UEs (not shown) may also use any one of the above-described frequency bands f1, f2, and f3.

The UEs 100-102 and the RSUs (UEs) 120-121 serving as UEs may receive V2X configuration from the network (e.g., the eNB 130, the RSU 320, or a V2X controller (not shown)). The V2X configuration may indicate measurement configuration for a carrier frequency band that is used for the V2X service. Additionally or alternatively, the V2X configuration may include a radio resource configuration for the V2X service. Additionally or alternatively, the V2X configuration may indicate a radio resource pool to be used for autonomous resource selection performed by the UEs 100-102 or the RSUs 120-121 for the V2X service. The V2X configuration may indicate allocation of dedicated radio resources to the UEs 100-102 or the RSUs 120-121 for the V2X service.

A V2X service Area (SA) may be defined to specify an area where the same V2X configuration is applied. The V2X SA may be defined in any one of: a dedicated carrier frequency band f1 reserved for the V2X service; a shared frequency band f2 for LSA; and a carrier frequency band f3 licensed to an operator of the cellular communication network. For example, a cell may be defined on the frequency band f3, and meanwhile the V2X SA may be defined on the frequency band f1 or f2. The V2X SA may be defined independently from a cell(s) or may be defined in association with a cell(s). In the former case, there may be a plurality of V2X SAs in one cell or there may be a V2X SA across a plurality of cells (i.e., a V2X SA that at least partially covers each of the plurality of cells). In the latter case, one V2X SA may be defined by one cell or by a combination of cells. Further, when a UE moves between cells belonging to the same V2X SA (i.e., the UE executes performs a cell re-selection or handover between the cells), the UE may continue the V2X service without suspending this service. Alternatively, the UE may suspend the V2X service while performing the cell re-selection or handover and then resume this service after completion of the cell re-selection or handover. That is, it can be considered that the V2X SA is a "valid area" of the V2X configuration. Information about the V2X SA (e.g., V2X SA Index (ID)) may be transmitted as one of information elements (IEs) contained in the V2X configuration or may be transmitted by a message or signalling other than the V2X configuration. For example, the eNB 130 or the RSU (eNB) 320 may incorporate the information about the V2X SA into the V2X configuration and then transmit the V2X configuration in the frequency band f3. In this case, the RSUs (UEs) 120 and 121 may further transmit information about the V2X SA on the frequency band f1 or f2. The RSUs (UEs) 120 and 121 may broadcast or groupcast the information about the V2X SA or transfer (or relay) this information to the UEs 100-102.

In the configurations shown in FIGS. 1-3, the server 140 may be co-located in the same site together with the eNB 130 or the RSU 320 or 321 serving as an eNB. Such a server is referred to as a Mobile Edge Computing (MEC) server. Alternatively, the server 140 may be installed at a remote site that is geographically located apart from the site where the eNB 130 (or the RSU 320 or 321) is installed and communicate with the eNB 130 via one or more entities (e.g., a Mobility Management Entity, a Packet Data Network Gateway (P-GW), and a Serving Gateway (S-GW)) in the cellular communication network.

The server 140 is preferably able to determine one or more sending nodes to transmit the V2X control message 170, which is generated based on the V2X report information 160 from the RSU 120 (or 320). The one or more sending nodes includes one or more eNBs, one or more RSUs each serving a UE, RSUs each serving as an eNB, or any combination thereof. The server 140 may designate a geographical area or a logical area, instead of specifically designating the one or more sending nodes. Alternatively, the server 140 may designate a logical area as well as designating the one or more sending nodes or the geographical area. The geographical area may be indicated by, for example, location information (e.g., GNSS location information), a cell, a tracking area (TA), a V2X service area (V2X SA), or information about the physical management area managed by one or more sending nodes (e.g., RSU, eNB), or any combination thereof. The logical area may be indicated by, for example, a network identifier (e.g., PLMN), an identifier assigned to a sending node, or a group identifier (e.g., RSU Group ID, eNB Group ID) configured for each group formed of one or more sending nodes, or any combination thereof.

Furthermore, there may be a plurality of distribution paths and a plurality of communication schemes available to the server 140 to transmit the V2X control message 170 to the plurality of UEs 100-102, as described with reference to FIGS. 1-3. In this case, the server 140 is preferably able to determine (select) a distribution path or a communication scheme or both to transmit the V2X control message 170.

The following description provides some embodiments for enabling the server 140 to easily and efficiently determine at least one of: (a) one or more sending nodes to transmit the V2X control message 170; (b) a geographical area in which the V2X control message 170 is to be transmitted; (c) a logical area in which the V2X control message is to be transmitted; (d) a distribution path of the V2X control message to one or more sending nodes; and (e) a communication scheme to be used for transmission of the V2X control message 170.

First Embodiment

In some implementations, the RSU 120 serving as a UE or the RSU 320 serving as an eNB may transmit its location-related information to the server 140. This location-related information allows the location of the transmission source RSU of the V2X report information 160 to be checked. The location of the RSU checked by using the location-related information may be a geographical location (e.g., the location coordinates or the location address) or may be a relationship with other RSUs or other eNBs (e.g., an adjacency relationship or a master-slave relationship). Specifically, this location-related information includes at least one of: a pre-configured RSU identifier; a pre-configured management area identifier; and location information indicating location coordinates or a location address.

The RSU identifier may be an ID (RSU ID) individually assigned to each RSU or may be an ID (RSU Group ID) assigned to an RSU group including a plurality of RSUs. The RSU identifier may be an IP address configured in the RSU. The RSU identifier may be a cell ID of a cell served by the RSU. The management area identifier may indicate a management area to which the RSU belongs, and may be a cell ID of a cell served by the eNB 130. The RSU identifier or the management area identifier may be an ID of a network operator (e.g., Public Land Mobile Network (PLMN) ID). The location information indicating location coordinates or a location address may be Global Navigation Satellite System (GNSS) location information obtained by a GNSS receiver installed in the RSU.

The RSU 120 or 320 may transmit its location-related information together with the V2X report information 160. Alternatively, the RSU 120 or 320 may transmit its location-related information using a message other than the V2X report information 160.

The server 140 may determine, using the location-related information about the transmission source RSU of the V2X report information 160, at least one of: (a) one or more sending nodes; (b) a geographical area; (c) a logical area; (d) a distribution path; and (e) a communication scheme, to distribute the V2X control message 170. The communication scheme may be any one of (1) MBMS (e.g., Multicast-broadcast single-frequency network (MBSFN), Single Cell Point To Multipoint (SC-PTM)), (2) CBS, and (3) groupcast or broadcast in D2D communication (e.g., ProSe communication). Alternatively, the communication scheme may be selected from among a plurality of communication schemes including at least two of them.

When the MBMS is used to distribute the V2X control message 170, the server 140 may serve as a Broadcast Multicast Service Center (BM-SC). Alternatively, the server 140 may communicate with the BM-SC via an Application Programming Interface (API) and may ask the BM-SC to distribute the V2X control message 170.

When the CBS is used to distribute the V2X control message 170, the server 140 may serve as one or both of a Cell Broadcast Entity (CBE) and a Cell Broadcast Center (CBC).

The server 140 may determine one or more sending RSUs as the one or more sending nodes based on the location-related information about the transmission source RSU of the V2X report information 160, and further determine at least one of a distribution path and a communication scheme to distribute the V2X control message 170 based on a type(s) of the determined one or more sending RSUs. The type of a sending RSU may be, for example, a UE type (i.e., an RSU serving as a UE) or an eNB type (i.e., an RSU serving as an eNB).

Figure 4:
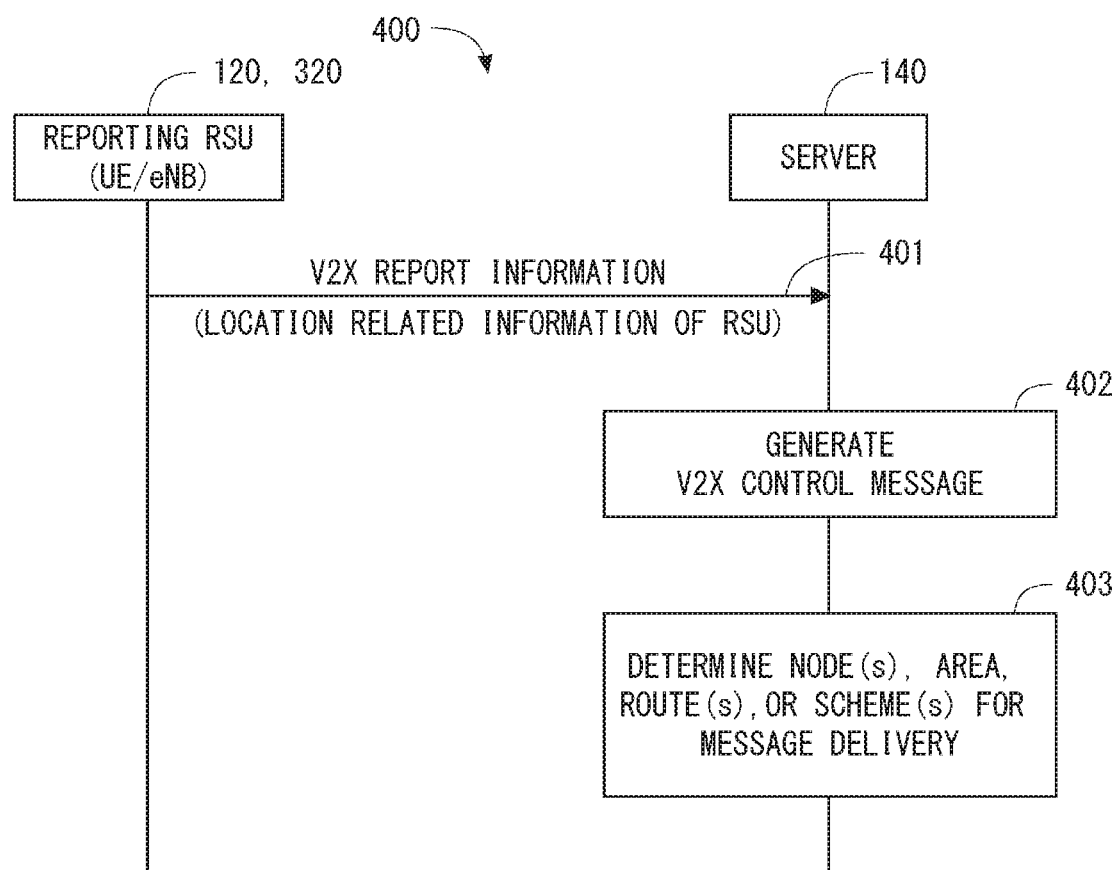
FIG. 4 is a sequence diagram showing one example of operations of an RSU and a server according to an embodiment.

FIG. 4 is a sequence diagram showing a process 400, which is an example of operations of the RSUs 120 and 320 and the server 140. In Step 401, the reporting RSU 120 or 320 serving as a UE or an eNB transmits, to the server 140, its location-related information (i.e., location-related information about the RSU) together with V2X report information 160.

In Step 402, the server 140 generates a V2X control message 170 based on the V2X report information 160. The server 140 may further take into account the location-related information about the reporting RSU to generate the V2X control message 170.

In Step 403, the server 140 determines, based on the location-related information about the reporting RSU, at least one of: (a) one or more sending nodes to transmit the V2X control message 170, (b) a geographical area in which the V2X control message 170 to be transmitted, (c) a logical area in which the V2X control message 170 to be transmitted, (d) a distribution path of the V2X control message to one or more sending nodes, and (e) a communication scheme to be used for transmission of the V2X control message 170 (i.e., Determine node(s), area, route(s), or scheme(s) for message delivery). The server 140 may further take into account the type or content of the V2X report information 160 to determine them.

Figure 5:
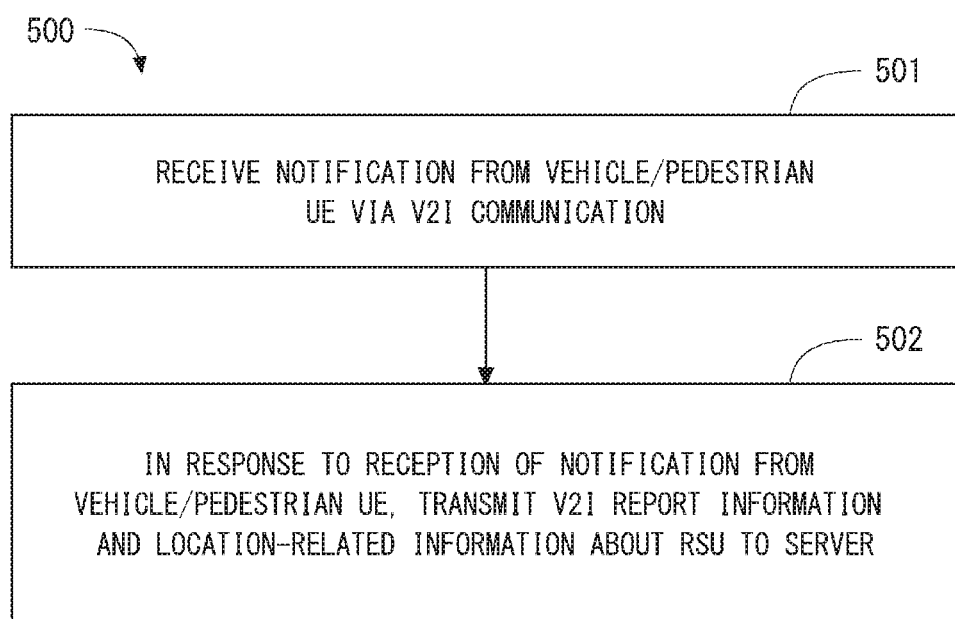
FIG. 5 is a flowchart showing one example of an operation of an RSU according to an embodiment.

FIG. 5 is a flowchart showing a process 500, which is an example of operations of the RSUs 120 and 320. In Step 501, the reporting RSU 120 or 320 serving as an UE or an eNB receives a notification 150 from a vehicle or pedestrian UE 100 via V2I communication. In Block 502, in response to receiving the notification 150, the reporting RSU 120 or 320 transmits V2X report information 160 and its location-related information to the server 140.

According to the operations (or method) shown in FIG. 5, the reporting RSU 120 or 320 can provide its location-related information to the server 140, thereby contributing to facilitating the determination by the server 140 of at least one of: the sending node(s); the area; the distribution path; and the communication scheme, to distribute the V2X control message 170.

Figure 6:
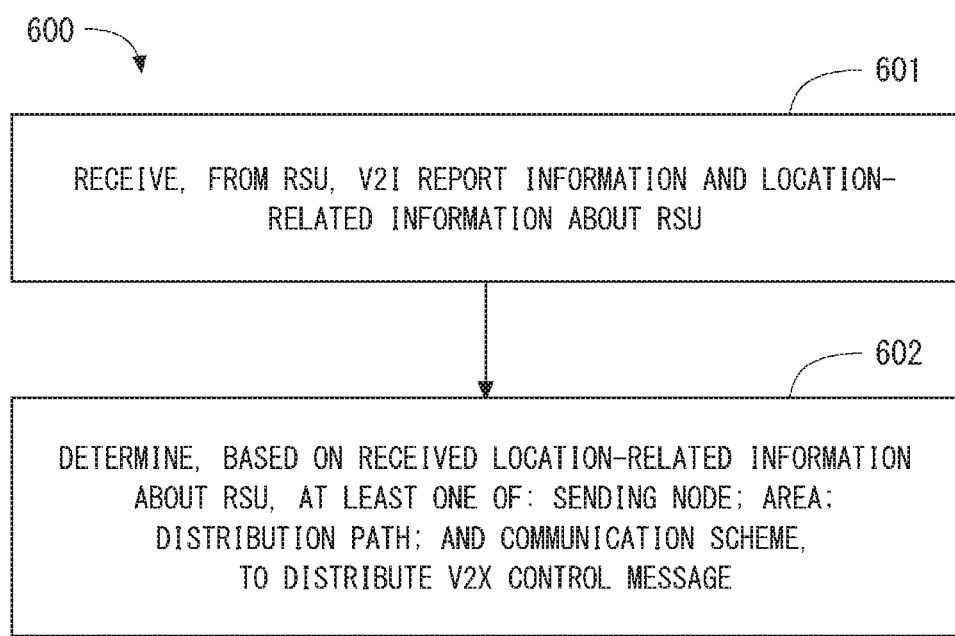
FIG. 6 is a flowchart showing one example of an operation of a server according to an embodiment.

FIG. 6 is a flowchart showing a process 600, which is an example of an operation of the server 140. In Step 601, the server 140 receives from the reporting RSU 120 or 320 V2X report information 160 and location-related information about the reporting RSU. In Step 602, using the received location-related information about the reporting RSU, the server 140 determines at least one of: sending node(s); an area; a distribution path; and a communication scheme, to distribute the V2X control message 170.

According to the operation (or method) shown in FIG. 6, the server 140 uses the location-related information about the reporting RSU 120 or 320 and thus can easily and efficiently determine at least one of: the sending node(s); the area; the distribution path; and the communication scheme, to distribute the V2X control message 170.

Second Embodiment

In the configuration shown in FIG. 1 or 2, the location-related information about the reporting RSU 120 may be generated by the eNB 130, not by the reporting RSU 120. That is, in response to receiving V2X report information 160 from the reporting RSU 120, the eNB 130 may transmit this V2X report information 160 to the server 140 and further transmit, to the server 140, location-related information that allows the location of the reporting RSU 120 to be checked. The eNB 130 may store location-related information about nearby RSUs (or RSUs connected to the eNB 130) in advance. The eNB 130 may receive location-related information about nearby RSUs from these RSUs and then store this information. Alternatively, location-related information about nearby RSUs may be pre-configured in the eNB 130 by an operator. Alternatively, the eNB 130 may transmit, to the server 140, location-related information that allows the location of the eNB 130 to be checked, in place of the location-related information about the reporting RSU 120. The location-related information that allows the location of the eNB 130 to be checked may include at least one of: location information indicating a geographical location (e.g., location coordinates or a location address) of the eNB 130; an identifier of the eNB 130; and an identifier of a cell served by the eNB 130 in which the reporting RSU 120 is located.

Figure 7:
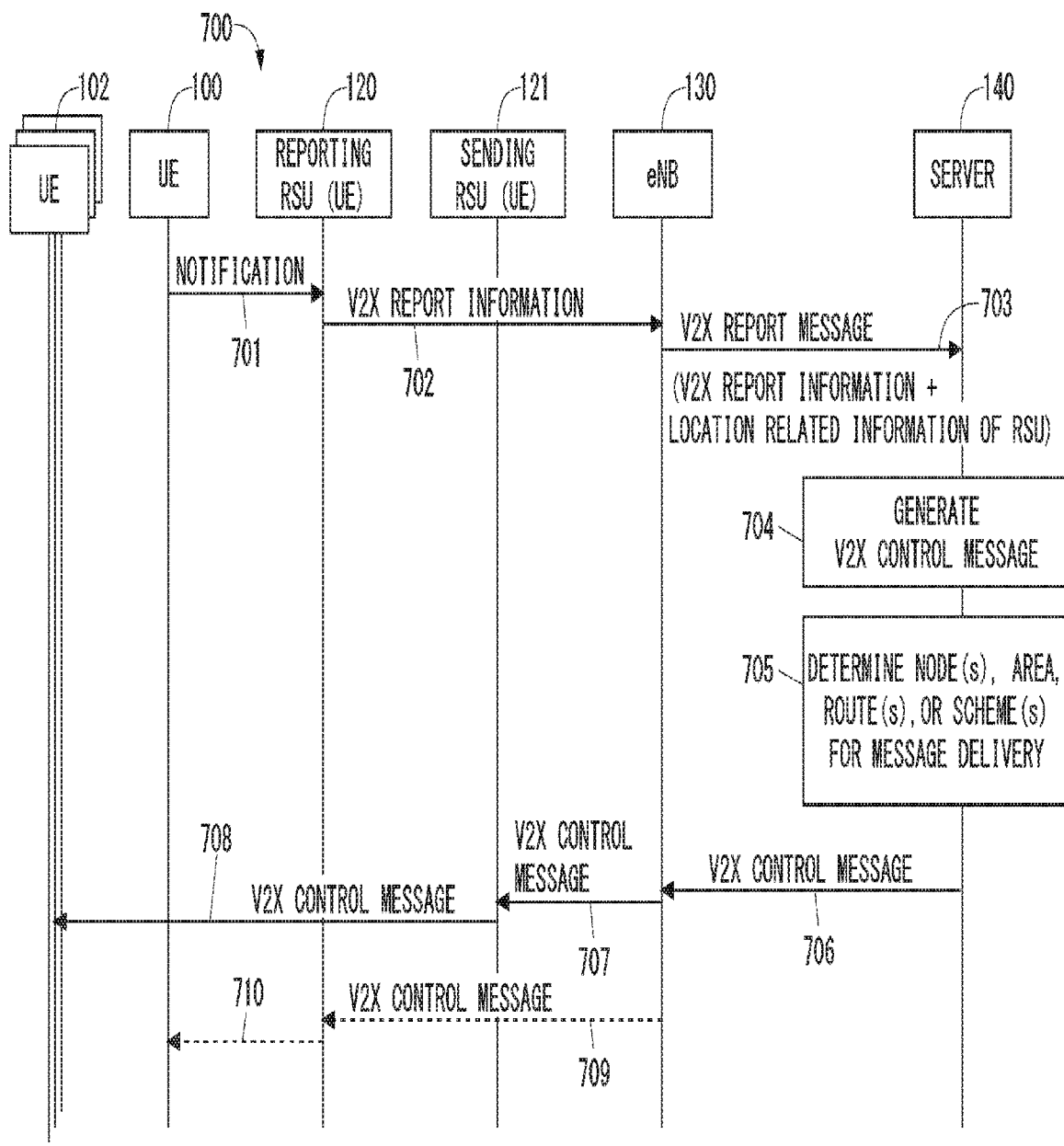
FIG. 7 is a sequence diagram showing one example of operations of an RSU, a base station, and a server according to an embodiment.

FIG. 7 is a sequence diagram showing a process 700, which is an example of operations of the UE 100, the UE 102, the RSU 120, the RSU 121, the eNB 130, and the server 140. In Step 701, the vehicle UE 100 transmits a notification 150 to the RSU 120 serving as a UE. In Step 702, the reporting RSU 120 transmits V2X report information 160 to the server 140 or the eNB 130. In Step 702, the reporting RSU 120 may transmit the V2X report information 160 either on the control plane (C-plane) or the user plane (U-plane). When the reporting RSU 120 transmits the information on the C-plane, it may use an existing SRB (e.g., SRB2) in LTE or may use SRBx (e.g., SRB3) that is newly defined for the V2X service.

In Step 703, in response to receiving the V2X report information 160 from the reporting RSU 120, the eNB 130 transmits to the server 140 a V2X report message containing the V2X report information 160 and the location-related information about the reporting RSU 120. In Step 703, the eNB 130 may transmit the V2X report message either on the control plane (C-plane) or on the user plane (U-plane).

The processes of the server 140 in Steps 704 and 705 are similar to those in Steps 402 and 403 shown in FIG. 4. In the example shown in FIG. 7, the sending node(s) determined in Step 705 includes the eNB 130 or the RSU 121 or both. The one or more sending nodes determined in Step 705 may include the reporting RSU 120.

In Step 706, the server 140 transmits a V2X control message 170 to the eNB 130 in accordance with the determination in Step 705. In Step 707, the eNB 130 transfers the V2X control message 170 to the sending RSU 121 in response to receiving the V2X control message 170. In Step 708, the sending RSU 121 transfers the V2X control message 170 to the vehicle UE 102. When the one or more sending nodes determined in Step 705 includes the reporting RSU 120, the eNB 130 transfers the V2X control message 170 to the RSU 120 in Step 709. In Step 710, the reporting RSU 120 serves as a sending RSU and transfers the V2X control message 170 to the vehicle UE 100 and the vehicle UE 101 (not shown).

Figure 8:
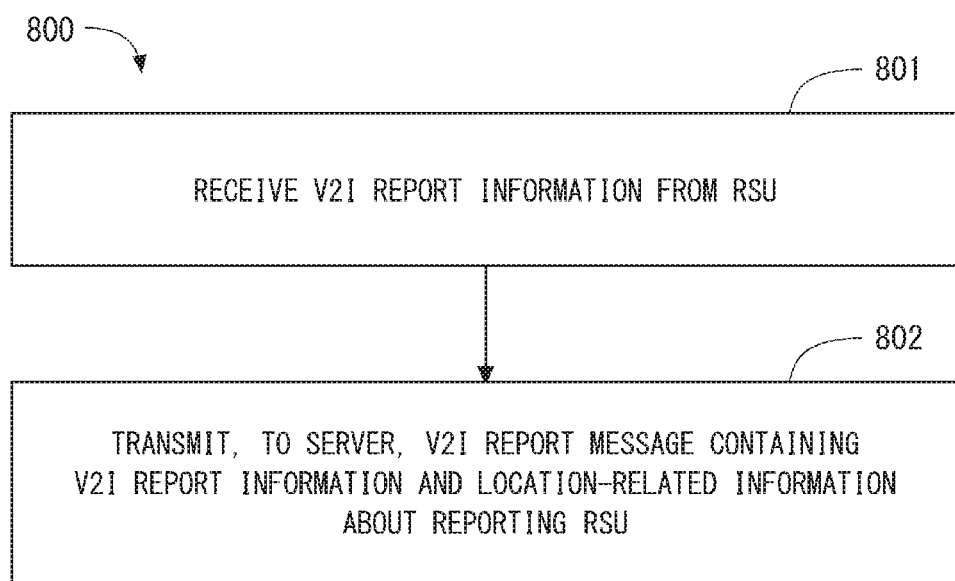
FIG. 8 is a flowchart showing one example of an operation of a base station according to an embodiment.

FIG. 8 is a flowchart showing a process 800, which is an example of an operation of the eNB 130. In Step 801, the eNB 130 receives V2X report information 160 from the reporting RSU 120. In Step 802, the eNB 130 transmits the V2X report information 160 and the location-related information about the reporting RSU 120 to the server 140.

According to the operation (or method) shown in FIG. 8, the eNB 130 provides the server 140 with the location-related information about the reporting RSU 120, thereby contributing to facilitating the determination by the server 140 of at least one of: the sending node(s); the area; the distribution path; and the communication scheme, to distribute the V2X control message 170.

Third Embodiment

In some implementations, in place of the server 140, the eNB 130 or the RSU 320 serving as an eNB may determine at least one of: a sending node(s); an area; a distribution path; and a communication scheme, to distribute a V2X control message 170. Specifically, the server 140 may determine at least one of the sending node(s), the area, and the distribution path, and then the eNB 130 (or the RSU 320) may determine at least the communication scheme. Alternatively, the server 140 may determine at least the communication scheme and then the eNB 130 (or the RSU 320) may determine at least one of the sending node(s), the area, and the distribution path.

Figure 9:
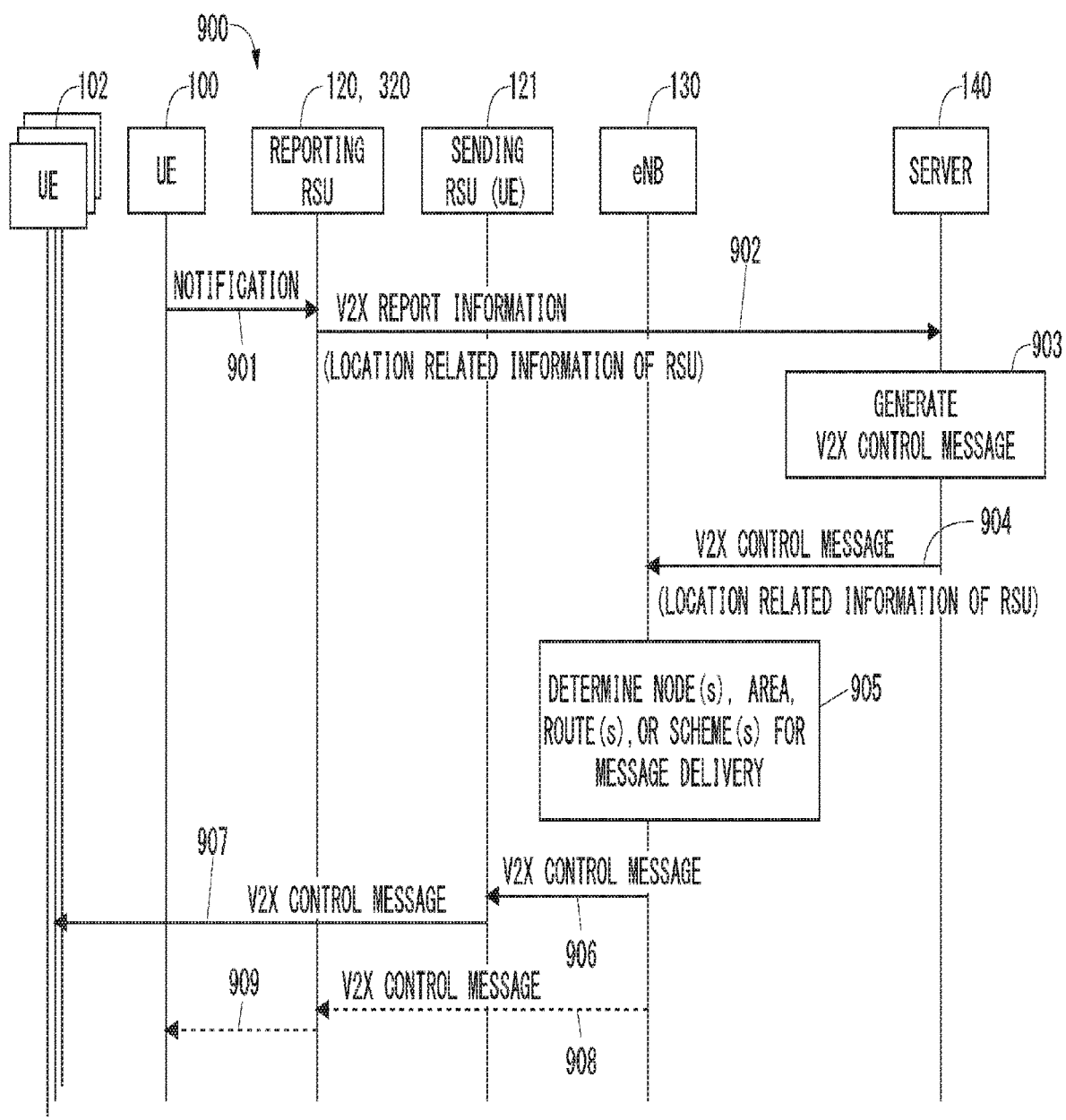
FIG. 9 is a sequence diagram showing one example of operations of an RSU, a base station, and a server according to an embodiment.

FIG. 9 is a sequence diagram showing a process 900, which is an example of operations of the UE 100, the UE 102, the RSUs 120 and 320, the RSU 121, the eNB 130, and the server 140. In Step 901, the vehicle UE 100 transmits a notification 150 to the RSU 120 or 320 serving as a UE or an eNB. In Step 902, the reporting RSU 120 or 320 transmits its location-related information (i.e., location-related information of RSU) to the server 140 together with V2X report information 160. In Step 902, the reporting RSU 120 or 320 may transmit the V2X report information 160 on the user plane (U-plane).

In Step 903, the server 140 generates a V2X control message 170 based on the V2X report information 160. The server 140 may further take into account the location-related information about the reporting RSU to generate the V2X control message 170.

In Step 904, the server 140 transmits the V2X control message 170 to the eNB 130 and also transmits the location-related information about the reporting RSU 120 or 320 to the eNB 130.

In Step 905, the eNB 130 determines at least one of: (a) one or more sending nodes to transmit the V2X control message 170 (i.e., one or more RSUs); (b) a geographical area in which the V2X control message 170 is to be transmitted; (c) a logical area in which the V2X control message 170 is to be transmitted; (d) a distribution path of the V2X control message to one or more sending nodes; and (e) a communication scheme to be used for transmission of the V2X control message 170 (i.e., Determine node(s), area, route(s), or scheme(s) for message delivery). In the example shown in FIG. 9, the sending node(s) determined in Step 905 includes the RSU 121. The one or more sending nodes determined in Step 905 may include the reporting RSU 120 or 320.

In Step 906, the eNB 130 transfers the V2X control message 170 to the sending RSU 121 in accordance with the determination in Step 905. In Step 907, the sending RSU 121 transfers the V2X control message 170 to the vehicle UE 102. When one or more sending nodes determined in Step 905 includes the reporting RSU 120 or 320, the eNB 130 transfers the V2X control message 170 to the RSU 120 or 320 in Step 908. In Step 909, the reporting RSU 120 or 320 serves as a sending RSU and transfers the V2X control message 170 to the vehicle UE 100 and the vehicle UE 101 (not shown).

According to the operations (or method) shown in FIG. 9, the base station 130 uses the location-related information about the reporting RSU 120 or 320 and thus can easily and efficiently determine at least one of the sending node(s), the area, the distribution path, and the communication scheme, to distribute the V2X control message 170.

Figure 10:
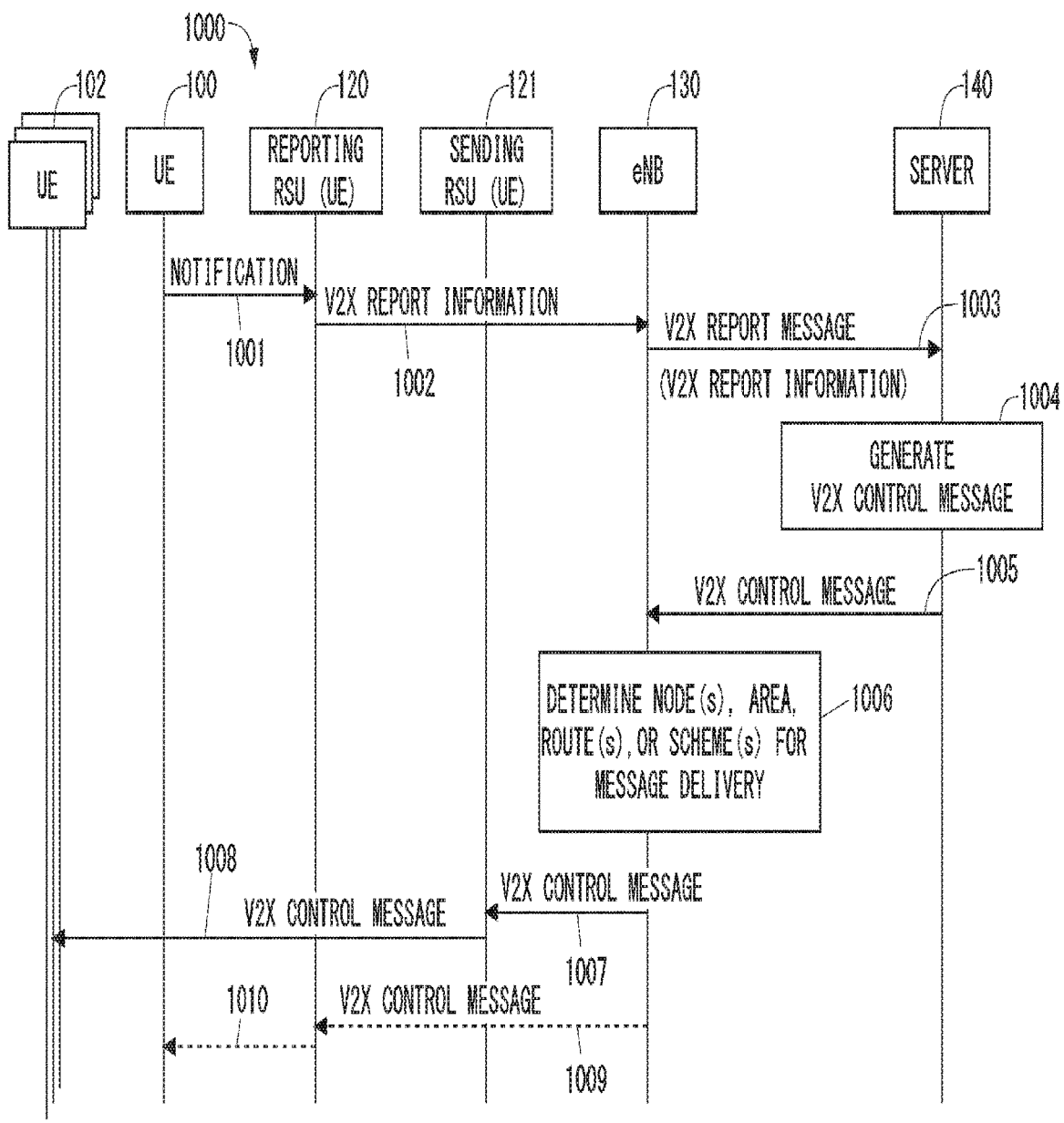
FIG. 10 is a sequence diagram showing one example of operations of an RSU, a base station, and a server according to an embodiment.

FIG. 10 is a sequence diagram showing a process 1000, which is another example of operations of the UE 100, the UE 102, the RSUs 120 and 320, the RSU 121, the eNB 130, and the server 140. Processes in Steps 1001, 1002, and 1003 are similar to those in Steps 701, 702, and 703 shown in FIG. 7. However, the V2X report message transmitted in Step 1003 does not need to include the location-related information about the reporting RSU 120.

In Step 1004, in response to receiving the V2X report message containing the V2X report information 160, the server 140 generates the V2X control message 170. The server 140 takes into account the V2X report information 160 to generate the V2X control message 170. The server 140 may further take into account the location-related information about the reporting RSU to generate the V2X control message 170.

In Step 1005, the server 140 transmits the V2X control message 170 to the eNB 130.

In Step 1006, the eNB 130 determines at least one of: (a) one or more sending nodes to transmit the V2X control message 170 (i.e., one or more RSUs); (b) a geographical area in which the V2X control message 170 is to be transmitted; (c) a logical area in which the V2X control message 170 is to be transmitted; (d) a distribution path of the V2X control message to one or more sending nodes; and (e) a communication scheme to be used for transmission of the V2X control message 170 (i.e., Determine node(s), area, route(s), or scheme(s) for message delivery). In the example shown in FIG. 10, the sending node(s) determined in Step 1006 includes the RSU 121. The one or more sending nodes determined in Step 1006 may include the reporting RSU 120.

To achieve the determination of the sending node(s) by the eNB 130 in Step 1006, the eNB 130 may store location-related information about nearby RSUs (or RSUs connected to the eNB 130) in advance. The eNB 130 may receive location-related information about nearby RSUs from these RSUs and then store this information. Alternatively, location-related information about nearby RSUs may be pre-configured in the eNB 130 by an operator.

In Step 1007, the eNB 130 transfers the V2X control message 170 to the sending RSU 121 in accordance with the determination in Step 1006. In Step 1008, the sending RSU 121 transfers the V2X control message 170 to the vehicle UE 102. When the one or more sending nodes determined in Step 1006 includes the reporting RSU 120, the eNB 130 transfers the V2X control message 170 to the RSU 120 in Step 1009. In Step 1010, the reporting RSU 120 serves as a sending RSU and transfers the V2X control message 170 to the vehicle UE 100 and the vehicle UE 101 (not shown).

In this embodiment, the eNB 130 may further take into account a type or content of the V2X report information 160 to determine at least one of: one or more sending nodes; an area; a distribution path; and a communication scheme, to distribute the V2X control message 170. In some implementations, to recognize the type or content of the V2X report information 160, the eNB 130 may execute deep packet inspection on the packet(s) that carries the V2X report information 160 and detect the type or content of the V2X report information.

Alternatively, the eNB 130 may detect the type or content of the V2X report information in accordance with a bearer that is used to transmit the V2X control message 170 from the server 140 to the eNB 130. In this case, one or more bearers between the server 140 and the eNB 130 are associated with respective types or contents of the V2X control message 170. The server 140 transmits the V2X control message 170 using a bearer (or IP flow) associated with the type or content of the V2X control message 170 to be transmitted.

Alternatively, the server 140 may send an indication regarding the type or content of the V2X control message 170 to the eNB 130. This operation is efficient when the server 140 is a MEC server.

Figure 11:
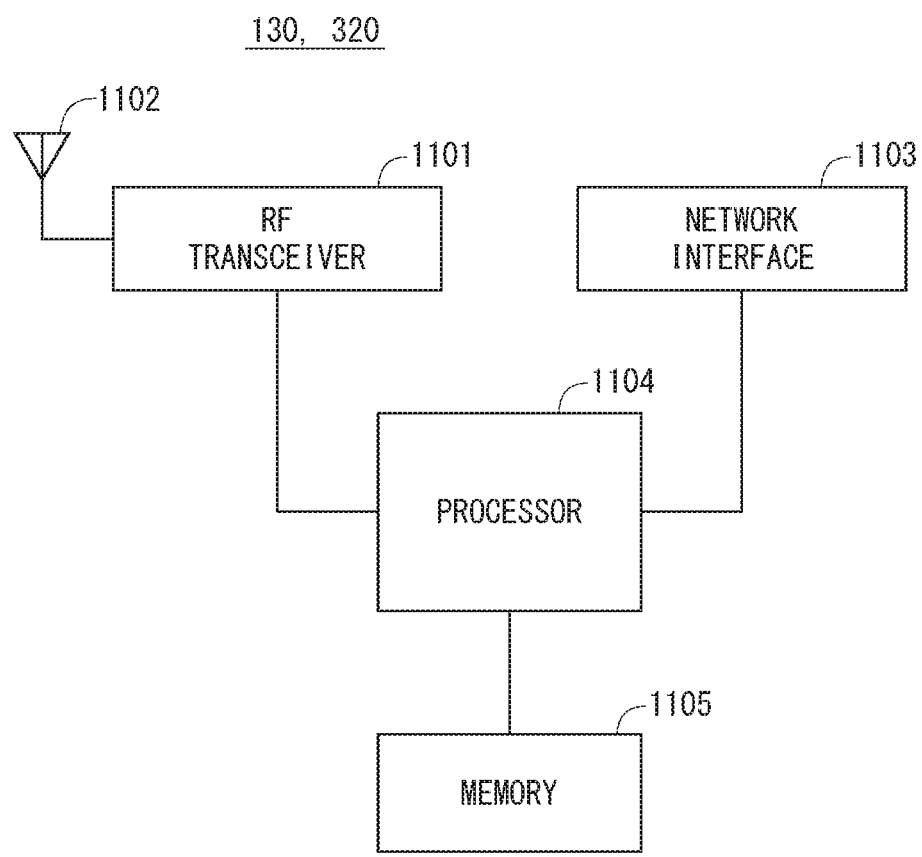
FIG. 11 is a block diagram showing a configuration example of an RSU and a base station according to an embodiment.

The following provides configuration examples of the UEs 100-102, the RSUs 120 and 320, the eNB 130, and the server 140 described in the above embodiments. FIG. 11 is a block diagram showing a configuration example of the eNB 130. The RSU 320, which serves as an eNB, may have a configuration similar to that shown in FIG. 11. Referring to FIG. 11, the eNB 130 includes an RF transceiver 1101, a network interface 1103, a processor 1104, and a memory 1105. The RF transceiver 1101 performs analog RF signal processing to communicate with UEs. The RF transceiver 1101 may include a plurality of transceivers. The RF transceiver 1101 is coupled to an antenna 1102 and the processor 1104. The RF transceiver 1101 receives modulated symbol data (or OFDM symbol data) from the processor 1104, generates a transmission RF signal, and supplies the transmission RF signal to the antenna 1102. Further, the RF transceiver 1101 generates a baseband reception signal based on a reception RF signal received by the antenna 1102 and supplies the baseband reception signal to the processor 1104.

The network interface 1103 is used to communicate with the network node (e.g., other eNBs, Mobility Management Entity (MME), Serving Gateway (S-GW), and TSS or ITS server). The network interface 1103 may include, for example, a network interface card (NIC) conforming to the IEEE 802.3 series.

The processor 1104 performs data plane processing including digital baseband signal processing and control plane processing for radio communication. In the case of LTE and LTE-Advanced, for example, the digital baseband signal processing performed by the processor 1104 may include signal processing of a PDCP layer, an RLC layer, a MAC layer, and a PHY layer. Further, the signal processing performed by the processor 1104 may include signal processing of a GTP-U·UDP/IP layer for X2-U and S1-U interfaces. Further, the control plane processing performed by the processor 1104 may include processing of an X2AP protocol, an S1-MME protocol, and an RRC protocol.

The processor 1104 may include a plurality of processors. The processor 1104 may include, for example, a modem processor (e.g., a DSP) that performs the digital baseband signal processing, a processor (e.g., a DSP) that performs signal processing of the GTP-U·UDP/IP layer for X2-U and S1-U interfaces, and a protocol stack processor (e.g., a CPU or an MPU) that performs the control plane processing.

The memory 1105 is composed of a combination of a volatile memory and a non-volatile memory. The memory 1105 may include a plurality of memory devices that are physically independent from each other. The volatile memory is, for example, a Static Random Access Memory (SRAM), a Dynamic RAM (DRAM), or a combination thereof. The non-volatile memory is a mask Read Only Memory (MROM), an Electrically Erasable Programmable ROM (EEPROM), a flash memory, a hard disc drive, or any combination thereof. The memory 1105 may include a storage that is located away from the processor 1104. In this case, the processor 1104 may access the memory 1105 via the network interface 1103 or an I/O interface (not shown).

The memory 1105 may store software modules (computer programs) including instructions and data to perform the processing by the eNB 130 described in the above embodiments. In some implementations, the processor 1104 may be configured to load the software modules from the memory 1105 and execute the loaded software modules, thereby performing processing of the eNB 130 described in the above embodiments.

Figure 12:
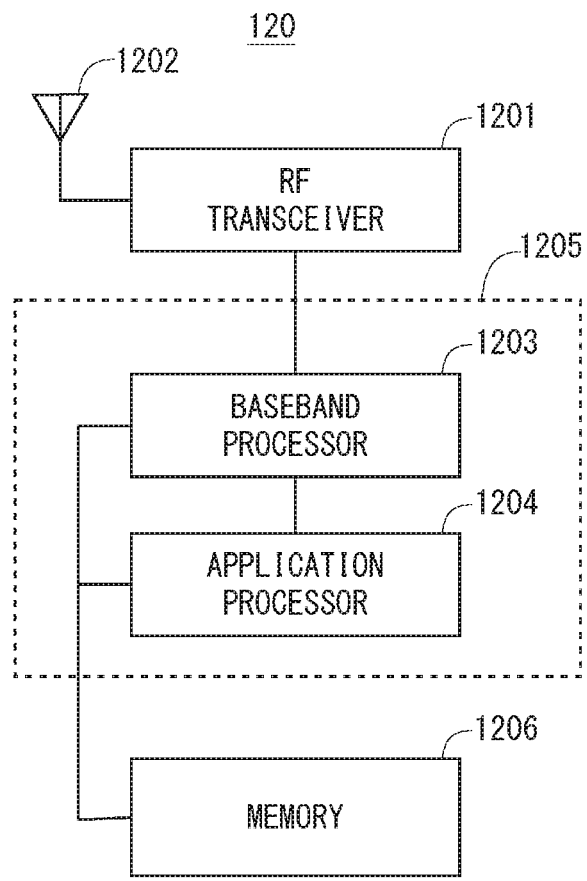
FIG. 12 is a block diagram showing a configuration example of an RSU and a radio terminal according to an embodiment.

FIG. 12 is a block diagram showing a configuration example of the RSU 120 serving as a UE (or a Relay UE). The UEs 101 and 102 may have configurations similar to the configuration shown in FIG. 12. A Radio Frequency (RF) transceiver 1201 performs analog RF signal processing to communicate with the eNB 130. The analog RF signal processing performed by the RF transceiver 1201 includes frequency up-conversion, frequency down-conversion, and amplification. The RF transceiver 1201 is coupled to an antenna 1202 and a baseband processor 1203. That is, the RF transceiver 1201 receives modulated symbol data (or OFDM symbol data) from the baseband processor 1203, generates a transmission RF signal, and supplies the transmission RF signal to the antenna 1202. Further, the RF transceiver 1201 generates a baseband reception signal based on a reception RF signal received by the antenna 1202, and supplies the baseband reception signal to the baseband processor 1203.

The baseband processor 1203 performs digital baseband signal processing (i.e., data plane processing) and control plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). On the other hand, the control plane processing includes communication management of layer 1 (e.g., transmission power control), layer 2 (e.g., radio resource management and hybrid automatic repeat request (HARQ) processing), and layer 3 (e.g., signalling regarding attach, mobility, and call management).

In the case of LTE and LTE-Advanced, for example, the digital baseband signal processing performed by the baseband processor 1203 may include signal processing of a Packet Data Convergence Protocol (PDCP) layer, a Radio Link Control (RLC) layer, the MAC layer, and the PHY layer. Further, the control plane processing performed by the baseband processor 1203 may include processing of a Non-Access Stratum (NAS) protocol, an RRC protocol, and MAC CEs.

The baseband processor 1203 may include a modem processor (e.g., a Digital Signal Processor (DSP)) that performs the digital baseband signal processing and a protocol stack processor (e.g., a Central Processing Unit (CPU) or a Micro Processing Unit (MPU)) that performs the control plane processing. In this case, the protocol stack processor, which performs the control plane processing, may be integrated with an application processor 1204 described in the following.

The application processor 1204 is also referred to as a CPU, an MPU, a microprocessor, or a processor core. The application processor 1204 may include a plurality of processors (processor cores). The application processor 1204 executes a system software program (Operating System (OS)) and various application programs (e.g., a voice call application, a WEB browser, a mailer, a camera operation application, and a music player application) loaded from a memory 1206 or from another memory (not shown), thereby providing various functions of the RSU 120.

In some implementations, as represented by a dashed line (1205) in FIG. 12, the baseband processor 1203 and the application processor 1204 may be integrated on a single chip. In other words, the baseband processor 1203 and the application processor 1204 may be implemented in a single System on Chip (SoC) device 1205. An SoC device may be referred to as a system Large Scale Integration (LSI) or a chipset.

The memory 1206 is a volatile memory, a non-volatile memory, or a combination thereof. The memory 1206 may include a plurality of memory devices that are physically independent from each other. The volatile memory is, for example, a Static Random Access Memory (SRAM), a Dynamic RAM (DRAM), or a combination thereof. The non-volatile memory is, for example, a Mask Read Only memory (MROM), an Electrically Erasable Programmable ROM (EEPROM), a flash memory, a hard disc drive, or any combination thereof. The memory 1206 may include, for example, an external memory device that can be accessed from the baseband processor 1203, the application processor 1204, and the SoC 1205. The memory 1206 may include an internal memory device that is integrated in the baseband processor 1203, the application processor 1204, or the SoC 1205. Further, the memory 1206 may include a memory in a Universal Integrated Circuit Card (UICC).

The memory 1206 may store software modules (computer programs) including instructions and data to perform processing by the RSU 120 described in the above embodiments. In some implementations, the baseband processor 1203 or the application processor 1204 may load the software modules from the memory 1206 and execute the loaded software modules, thereby performing the processing of the RSU 120 described in the above embodiments.

Figure 13:
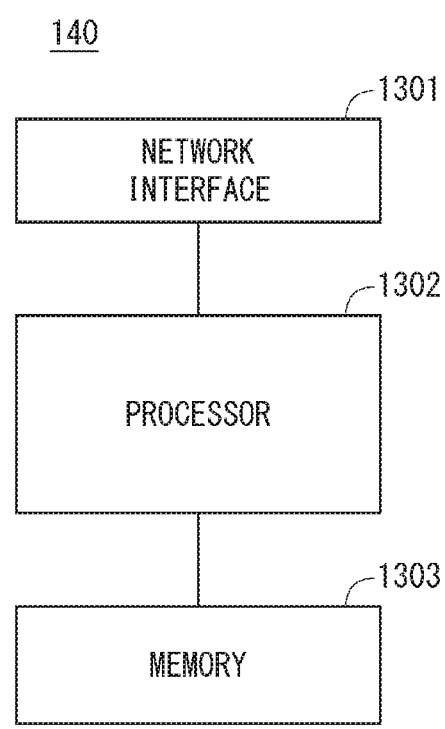
FIG. 13 is a block diagram showing a configuration example of a server according to an embodiment.

FIG. 13 is a block diagram showing a configuration example of the server 140. Referring to FIG. 13, the server 140 includes a network interface 1301, a processor 1302, and a memory 1303. The network interface 1301 is used to communicate with the network node (e.g., the eNodeB 130, the MME, or the P-GW). The network interface 1301 may include, for example, a network interface card (NIC) conforming to the IEEE 802.3 series.

The processor 1302 loads software (computer programs) from the memory 1303 and executes the loaded software (computer programs), thereby performing processing of the server 140 described with reference to the sequence diagram and the flowchart in the above-described embodiments. The processor 1302 may be, for example, a microprocessor, an MPU, or a CPU. The processor 1302 may include a plurality of processors.

The memory 1303 is composed of a combination of a volatile memory and a non-volatile memory. The memory 1303 may include a storage that is located away from the processor 1302. In this case, the processor 1302 may access the memory 1303 via an I/O interface (not shown).

In the example shown in FIG. 13, the memory 1303 is used to store software modules. The processor 1302 loads these software modules from the memory 1303 and executes the loaded software modules, thereby performing processing of the server 140 described in the above embodiments.

As described above with reference to FIGS. 11-13, each of the processors included in the UEs 100-102, the RSUs 120 and 320, the eNB 130, and the server 140 according to the above embodiments executes one or more programs including instructions to cause a computer to perform an algorithm described with reference to the drawings. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

OTHER EMBODIMENTS

In the configuration shown in FIG. 1 or 2, the RSUs 120 and 121 each may be configured to periodically transmit a keepalive message or a heartbeat message to the eNB 130 or the server 140. Upon failing to receive a keep-alive or heartbeat message from an RSU, the eNB 130 or the server 140 may detect that a fault has occurred in this RSU. Further, when determining at least one of: a sending node(s); an area; a distribution path; and a communication scheme, to distribute the V2X control message 170 as described in the above embodiments, the eNB 130 or the server 140 may exclude this RSU, in which a failure has been detected, from the candidates for the sending node(s), the area, or the distribution path.

The above embodiments provides some examples to enable the server 140 or the eNB 130 to easily and efficiently determine at least one of: (a) one or more sending nodes to transmit the V2X control message 170; (b) a geographical area in which the V2X control message 170 is to be transmitted; (c) a distribution path of the V2X control message to one or more sending nodes; and (d) a communication scheme to be used for transmission of the V2X control message 170. The determination in (a) to (d) may be performed, for example, as shown below.
(a) Determination of One or More Sending Nodes to Transmit the V2X Control Message 170:

In one example, the server 140 or the eNB 130 may manage a list(s) of adjacent sending nodes (e.g., a list(s) of adjacent RSUs) and select a sending node(s) in the list of adjacent sending nodes that includes the reporting node (e.g., reporting RSU) to transmit the V2X control message 170. In another example, the server 140 or the eNB 130 may select one or more sending nodes that have the same group ID as the reporting node to transmit the V2X control message 170.
(b) Determination of a Geographical Area in which the V2X Control Message 170 is to be Transmitted:

In one example, the server 140 or the eNB 130 may select one or more sending nodes that belong in the same Tracking Area (TA) or Routing Area (RA) as the reporting node to transmit the V2X control message 170. In other words, the server 140 or the eNB 130 may designate a TA or RA as the geographical area in which the V2X control message 170 is to be transmitted. In another example, the server 140 or the eNB 130 may select a sending node(s) located in a certain area including the GNSS location coordinates of the reporting node, to transmit the V2X control message 170. In another example, the server 140 or the eNB 130 may designate a geographical area based on the V2X service area (V2X SA) to which the reporting node belongs as the geographical area in which the V2X control message 170 is to be transmitted. In other words, the server 140 or the eNB 130 may designate a geographical area based on GNSS location coordinates as the geographical area in which the V2X control message 170 is to be transmitted. Further, in another example, the server 140 or the eNB 130 may select one or more sending nodes installed on the same road as the reporting node, to transmit the V2X control message 170. In other words, the server 140 or the eNB 130 may designate a road as the geographical area in which the V2X control message 170 is to be transmitted.
(c) Determination of a Distribution Path of the V2X Control Message to One or More Sending Nodes:

In one example, the server 140 or the eNB 130 may select, based on the location-related information about the reporting RSU, a communication path that can be used for message distribution to the surroundings of the reporting RSU. In another example, the server 140 or the eNB 130 may select, based on the location-related information about the reporting RSU, a communication path that can be used for message distribution to one or more other RSUs managed by the same cellular communication network as the reporting RSU.
(d) Determination of a Communication Scheme to be Used for Transmission of the V2X Control Message 170:

In one example, the server 140 or the eNB 130 may select, based on the location-related information about the reporting RSU, a communication scheme that can be used for message distribution to the surroundings of the reporting RSU. In another example, the server 140 or the eNB 130 may select, based on the location-related information about the reporting RSU, a communication scheme provided by the cellular communication network that manages the reporting RSU (i.e., a communication scheme that can be used for message distribution to one or more other RSUs managed by the same cellular communication network as the reporting RSU).

Further, a group ID or type of an RSU may indicate characteristics of the road on which this RSU is installed. When, for example, there are RSUs installed respectively for an inbound lane and an outbound lane (i.e., when a cell formed by each RSU is mapped only into an outbound lane or an inbound lane), an RSU group ID or RSU type may indicate a lane (i.e., outbound or inbound). For example, an RSU having the group ID or type indicating "inbound lane"

detects an event occurred on the inbound lane (e.g., occurrence of an accident or a traffic jam) and then sends to a server a report indicating that the event has occurred, enabling the server to select an RSU(s) having the same group ID or type as the reporting RSU to transmit the V2X control message.

Alternatively, the group ID or type of an RSU may indicate a type of road. For example, there are a general road (or expressway) on an elevated structure and an expressway (or general road) under this elevated structure. Further, for example, there are a general road (or expressway) on the ground and an underground expressway (or general road) underneath of the general road (or expressway). In these cases, the group ID or type of an RSU may set to "on an elevated structure" or "under an elevated structure", to "on the ground" or "underground", or to "an expressway" or "a general road". For example, an RSU having the RSU group ID or type indicating "on an elevated structure" or "an expressway" sends to a server a report indicating an event that has occurred in the expressway on the elevated structure (e.g., occurrence of an accident or a traffic jam), enabling the server to select one or more RSUs having the same RSU group ID or type as the reporting RSU to transmit the V2X control message.

The descriptions of the above-described embodiments mainly focus on LTE/LTE-Advanced and extensions thereof. However, the above-described embodiments may be applied to other radio communication networks or systems.

Further, the embodiments described above are merely examples of applications of the technical ideas obtained by the present inventors. Needless to say, these technical ideas are not limited to the above-described embodiments and various modifications can be made thereto.

For example, the whole or part of the embodiments disclosed above can be described as, but not limited to, the following supplementary notes.

(Supplementary Note A1)

A Road Side Unit (RSU) apparatus supporting a Vehicle-to-Everything (V2X) service, the RSU apparatus comprising:

a wireless transceiver configured to communicate with a radio terminal installed in a vehicle; and at least one processor configured to transmit V2X report information to a control node and to transmit location-related information about the RSU apparatus to the control node.

(Supplementary Note A2)

The RSU apparatus according to Supplementary Note A1, wherein the location-related information is used by the control node to determine at least one of:
(a) one or more sending nodes to transmit a V2X control message generated based on the V2X report information in such a way that a plurality of vehicles are able to receive the V2X control message;
(b) a geographical area in which the V2X control message is to be transmitted;
(c) a logical area in which the V2X control message is to be transmitted;
(d) a distribution path of the V2X control message to the one or more sending nodes; and
(e) a communication scheme to be used for transmission of the V2X control message.

(Supplementary Note A3)

The RSU apparatus according to Supplementary Note A2, wherein the communication scheme is selected from among a plurality of communication schemes including at least two of (a) a Multimedia Broadcast/Multicast Service (MBMS), (b) a Cell Broadcast Service (CBS), and (c) a groupcast/broadcast in Device-to-Device communication.

(Supplementary Note A4)

The RSU apparatus according to Supplementary Note A2 or A3, wherein the one or more sending nodes comprises: (a) one or more base stations used in a cellular communication network; (b) one or more RSUs, each of which operates as a base station used in a cellular communication network; (c) one or more RSUs, each of which operates as a radio terminal used in a cellular communication network; or (d) any combination thereof.

(Supplementary Note A5)

The RSU apparatus according to any one of Supplementary Notes A1 to A4, wherein the location-related information comprises at least one of: a pre-configured RSU identifier; a pre-configured management area identifier; and location information indicating location coordinates or a location address of the RSU apparatus.

(Supplementary Note A6)

The RSU apparatus according to any one of Supplementary Notes A1 to A4, wherein the RSU apparatus is configured to operate as a radio terminal or a base station used in a cellular communication network.

(Supplementary Note A7)

The RSU apparatus according to any one of Supplementary Notes A1 to A6, wherein the V2X report information contains a message that the RSU apparatus has received via V2I communication from a radio terminal installed in a vehicle.

(Supplementary Note B1)

A base station apparatus used in a cellular communication network, the base station apparatus comprising:

a wireless transceiver configured to communicate with a plurality of radio terminals including one or more Road Side Units (RSUs) supporting a Vehicle-to-Everything (V2X) service; and at least one processor configured to transmit V2X report information received from a first RSU included in the one or more RSUs to a control node and to transmit location-related information about the first RSU to the control node.

(Supplementary Note B2)

The base station apparatus according to Supplementary Note B1, wherein the location-related information is used by the control node to determine at least one of:
(a) one or more sending nodes to transmit a V2X control message generated based on the V2X report information in such a way that a plurality of vehicles are able to receive the V2X control message;
(b) a geographical area in which the V2X control message is to be transmitted;
(c) a logical area in which the V2X control message is to be transmitted;
(d) a distribution path of the V2X control message to the one or more sending nodes; and
(e) a communication scheme to be used for transmission of the V2X control message.

(Supplementary Note B3)

The base station apparatus according to Supplementary Note B2, wherein the communication scheme is selected from among a plurality of communication schemes including at least two of (a) a Multimedia Broadcast/Multicast Service (MBMS), (b) a Cell Broadcast Service (CBS), and (c) a groupcast/broadcast in Device-to-Device communication.

(Supplementary Note B4)

The base station apparatus according to Supplementary Note B2 or B3, wherein the one or more sending nodes comprises: (a) one or more base stations used in a cellular communication network; (b) one or more RSUs, each of which operates as a base station used in a cellular communication network; (c) one or more RSUs, each of which operates as a radio terminal used in a cellular communication network; or (d) any combination thereof.

(Supplementary Note B5)

The base station apparatus according to any one of Supplementary Notes B1 to B4, wherein the location-related information comprises at least one of: a pre-configured RSU identifier; a pre-configured management area identifier; and location information indicating location coordinates or a location address of the first RSU.

(Supplementary Note B6)

The base station apparatus according to any one of Supplementary Notes B1 to B5, wherein the V2X report information contains a message that the first RSU has received via V2I communication from a radio terminal installed in a vehicle.

(Supplementary Note C1)

A control node comprising:
a memory; and
at least one processor coupled to the memory and configured to determine, based on location-related information about a first Road Side Unit (RSU) supporting a Vehicle-to-Everything (V2X) service, at least one of:
(a) one or more sending nodes to transmit a V2X control message generated based on V2X report information transmitted by the first RSU in such a way that a plurality of vehicles are able to receive the V2X control message;
(b) a geographical area in which the V2X control message is to be transmitted;
(c) a logical area in which the V2X control message is to be transmitted;
(d) a distribution path of the V2X control message to the one or more sending nodes; and
(e) a communication scheme to be used for transmission of the V2X control message.

(Supplementary Note C2)

The control node according to Supplementary Note C1, wherein the location-related information comprises at least one of: a pre-configured RSU identifier; a pre-configured management area identifier; and location information indicating location coordinates or a location address of the first RSU.

(Supplementary Note C3)

The control node according to Supplementary Note C1 or C2, wherein the communication scheme is selected from among a plurality of communication schemes including at least two of (a) a Multimedia Broadcast/Multicast Service (MBMS), (b) a Cell Broadcast Service (CBS), and (c) a groupcast/broadcast in Device-to-Device communication.

(Supplementary Note C4)

The control node according to any one of Supplementary Notes C1 to C3, wherein the one or more sending nodes comprises: (a) one or more base stations used in a cellular communication network; (b) one or more RSUs, each of which operates as a base station used in a cellular communication network; (c) one or more RSUs, each of which operates as a radio terminal used in a cellular communication network; or (d) any combination thereof.

(Supplementary Note C5)

The control node according to Supplementary Note C4, wherein
the at least one processor is configured to determine, based on the location-related information, the one or more RSUs as the one or more sending nodes, and the at least one processor is further configured to determine at least one of the distribution path and the communication scheme based on a type of the one or more RSUs.

(Supplementary Note C6)

The control node according to any one of Supplementary Note C1 to C5, wherein the at least one processor is further configured to generate the V2X control message in response to reception of the V2X report information.

(Supplementary Note C7)

The control node according to any one of Supplementary Note C1 to C5, wherein the at least one processor is further configured to receive from an external node the V2X control message generated based on the V2X report information, and to determine, based on a type or a content of the V2X control message, at least one of: the one or more sending nodes; the geographical area; the logical area; the distribution path; and the communication scheme.

(Supplementary Note C8)

The control node according to any one of Supplementary Notes C1 to C5, wherein
the at least one processor is further configured to receive from an external node the V2X control message generated based on the V2X report information, and to determine, in accordance with a bearer used to transmit the V2X control message from the external node to the control node, at least one of: the one or more sending nodes; the geographical area; the logical area; the distribution path; and the communication scheme, and
the bearer is associated in advance with a type or a content of the V2X control message.

This application is based upon and claims the benefit of priority from Japanese Patent Application No. 2015-185291, filed on Sep. 18, 2015, the disclosure of which is incorporated herein in its entirety by reference.

REFERENCE SIGNS LIST

100-102 UE
120, 121 RSU
121 RSU
130 eNB
140 SERVER
150 NOTIFICATION
160 V2X REPORT INFORMATION
170 V2X CONTROL MESSAGE
320, 321 RSU
1001 RF TRANSCEIVER
1004 PROCESSOR
1101 RF TRANSCEIVER
1103 BASEBAND PROCESSOR
1104 APPLICATION PROCESSOR
1202 PROCESSOR
1203 MEMORY

The invention claimed is:

1. A Road Side Unit (RSU) apparatus supporting a Vehicle-to-Everything (V2X) service, the RSU apparatus comprising:
a wireless transceiver configured to communicate with a radio terminal installed in a vehicle; and
at least one processor configured to transmit V2X report information to a control node and to transmit location-related information about the RSU apparatus to the control node,
wherein the location-related information is used by the control node to determine a logical area in which a V2X control message generated in response to the V2X report information is to be transmitted, the V2X report information includes information related to an accident, and the V2X control message includes a warning about the accident.

2. The RSU apparatus according to claim 1, wherein the location-related information comprises at least one of: a pre-configured RSU identifier; a pre-configured management area identifier; and location information indicating location coordinates or a location address of the RSU apparatus.

3. A base station apparatus used in a cellular communication network, the base station apparatus comprising:

a wireless transceiver configured to communicate with a plurality of radio terminals including one or more Road Side Units (RSUs) supporting a Vehicle-to-Everything (V2X) service; and at least one processor configured to transmit V2X report information received from a first RSU included in the one or more RSUs to a control node and to transmit location-related information about the first RSU to the control node, wherein the location-related information is used by the control node to determine a logical area in which a V2X control message generated in response to the V2X report information is to be transmitted, the V2X report information includes information related to an accident, and the V2X control message includes a warning about the accident.

4. The base station apparatus according to claim 3, wherein the location-related information comprises at least one of: a pre-configured RSU identifier; a pre-configured management area identifier; and location information indicating location coordinates or a location address of the RSU apparatus.

5. A method performed by a Road Side Unit (RSU) apparatus supporting a Vehicle-to-Everything (V2X) service, the method comprising:

transmitting V2X report information to a control node; and transmitting location-related information about the RSU apparatus to the control node, wherein the location-related information is used by the control node to determine a logical area in which a V2X control message generated in response to the V2X report information is to be transmitted, the V2X report information includes information related to an accident, and the V2X control message includes a warning about the accident.

6. The method according to claim 5, wherein the location-related information comprises at least one of: a pre-configured RSU identifier; a pre-configured management area identifier; and location information indicating location coordinates or a location address of the RSU apparatus.

7. A method performed by a base station apparatus used in a cellular communication network, the method comprising:

communicating with a plurality of radio terminals including one or more Road Side Units (RSUs) supporting a Vehicle-to-Everything (V2X) service;

transmitting V2X report information received from a first RSU included in the one or more RSUs to a control node; and transmitting location-related information about the first RSU to the control node, wherein the location-related information is used by the control node to determine a logical area in which a V2X control message generated in response to the V2X report information is to be transmitted, the V2X report information includes information related to an accident, and the V2X control message includes a warning about the accident.

8. The method according to claim 7, wherein the location-related information comprises at least one of: a pre-configured RSU identifier; a pre-configured management area identifier; and location information indicating location coordinates or a location address of the RSU apparatus.

* * * * *